Figure 1:
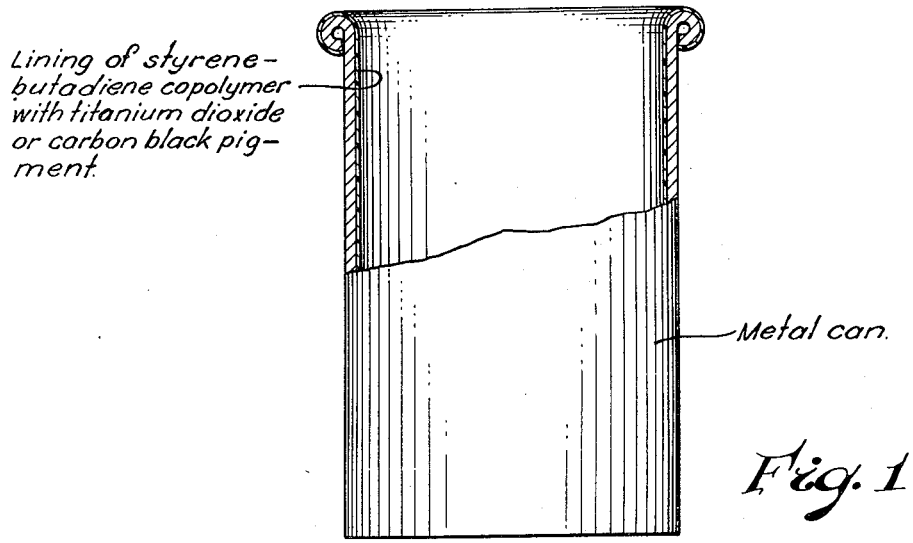

Dec. 22, 1959   F. K. QUIGLEY, JR., ET AL   2,918,194
TANK LINING
Filed Sept. 29, 1955

INVENTORS.
Fred K. Quigley, Jr.
Harold A. Walters

BY Griswold & Burdick
ATTORNEYS

United States Patent Office 2,918,194
Patented Dec. 22, 1959

2,918,194
TANK LINING

Fred K. Quigley, Jr., Midland, and Harold A. Walters, Beaverton, Mich., assignors to The Dow Chemical Company, Midland, Mich., a corporation of Delaware Application September 29, 1955, Serial No. 537,559

6 Claims. (Cl. 220—64)

This invention concerns metal containers having a corrosion proof lining which is resistant to strong alkalies and relates to the storage and transport of strong aqueous solutions of alkali metal hydroxides. It relates more particularly to metal containers having a continuous adherent film or lining comprised of a tough copolymer of styrene and butadiene and relates to a method of making such lined metal containers.

The problem of prevention of corrosion of metal containers employed in the handling and transporting of industrial chemicals so as to avoid discoloring or contaminating the chemicals with metals or salts of the metals, especially iron, due to contact of the chemicals with walls of the containers has attracted many workers, and many solutions to the problem have been proposed. To overcome the corrosion of metal containers such as tank cars, storage vessels, barrels, cans, etc., they have been lined with glass, various elastomers such as rubber, neoprene, or polyisobutylene, or synthetic resins, e.g. polyvinyl chloride or copolymers of vinyl chloride and other polymerizable monomers.

The linings heretofore proposed, while satisfactory for preventing the corrosion of metal containers employed in the handling and transporting of many industrial chemicals, have not been entirely satisfactory for the storing and shipping of liquid or molten concentrated aqueous solutions of alkali metal hydroxides, e.g. an aqueous 25 to 75 weight percent solution of sodium hydroxide. The glass linings have the disadvantage that they will chip and crack easily, and are attacked by concentrated aqueous solutions of alkali metal hydroxides. The elastomers are usually made into lining material by compounding with fillers, stabilizers, etc., and then calendered or extruded in the form of flat sheets of various thickness which are cut to a desired shape and applied to metal surfaces by means of an adhesive. Such linings tend to shrink and pull away from walls of the metal containers, particularly at the seams, apparently because the lining material is not dimensionally stable due to strains in the calendered sheets. The synthetic resins are usually employed as a varnish or paint, i.e. as a solution of the resin dissolved in a volatile organic solvent, with, or without, pigments or fillers, and are applied as a coating or layer to the metal surface by brushing or spraying which coating is allowed to dry or is baked or heated after drying to obtain a continuous film or lining of the resin. The applying of such varnish or paint requires special precautions to avoid breathing or contact of vapors of the solvents, and is hazardous.

In order to meet all of the requirements of a tank lining suitable for the storing and transporting of liquid or molten concentrated aqueous solutions of alkali metal hydroxides, the lining material must be capable of being readily, rapidly and efficiently applied to walls of a metal container, e.g. a tank car or storage vessel, to produce a tough adherent continuous lining, not shrinking or distorting upon heating, and resistant or impervious to the alkali metal hydroxide or its salts.

It is an object of the invention to provide metal containers having a corrosion proof lining which is resistant to attack by alkali metal hydroxides. Another object is to provide metal containers having inner walls thereof coated with an adherent lining comprised essentially of a plurality of films of a tough copolymer of styrene and butadiene. Still another object is to provide metal containers suitable for the storing and transporting of liquid concentrated aqueous alkali metal hydroxide solutions which containers have their inner walls coated with an adherent continuous lining comprised of a vulcanized copolymer of styrene and butadiene and a pigment. A further object is to provide a method of forming an adherent, tough, continuous lining comprised essentially of a tough copolymer of butadiene and styrene on inner walls of a metal container, e.g. a tank car. Other and related objects will appear from the following description of the invention.

According to the invention a metal container having an adherent, continuous, tough, corrosion proof lining resistant to attack by liquid or molten concentrated aqueous solutions of alkali metal hydroxides can readily be prepared by coating interior surfaces of a metal tank, e.g. a tank car, barrel or can, with one or more layers of an aqueous dispersion comprising essentially a synthetic latex of a copolymer of from 55 to 70 percent by weight of styrene and from 45 to 30 percent of butadiene-1,3, suitably admixed with a pigment such as titanium dioxide or carbon black, and drying or curing the coating to obtain an impervious non-tacky or substantially tack-free film.

The invention is illustrated with reference to the accompanying drawing wherein:

Fig. 1 is a side elevation of a metal can partly in section having a removable cover (not shown). Interior surfaces of the can are coated with an adherent continuous tough lining of styrene-butadiene copolymer and a pigment of titanium dioxide or carbon black. The lining or coating is formed by applying one or more layers of an aqueous dispersion of the synthetic latex and pigment, suitably thickened to a consistency comparable to that of paint, by brushing or spraying and drying the resulting layer(s) to form a continuous lining or coating. The cover of the can is also painted with a layer of the aqueous composition and dried to form an adherent continuous coating.

Figure 2:
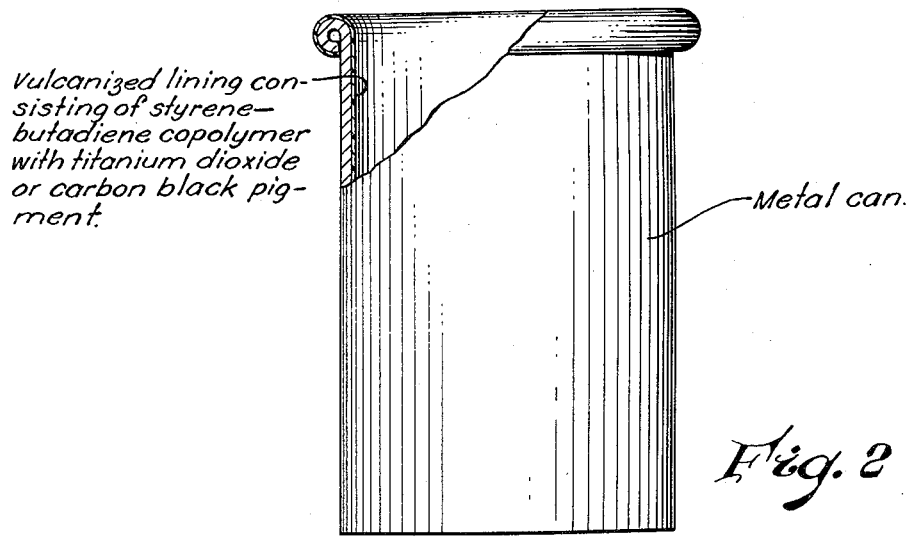

Fig. 2 is a side elevation of a metal can partly in section showing interior surfaces thereof having a lining consisting of a plurality of dried layers of an aqueous composition comprising a synthetic latex of a copolymer of styrene and butadiene and a pigment of titanium dioxide or carbon black, which plurality of dried layers have been vulcanized to form an adherent continuous tough composite lining.

The latex of the copolymer of styrene and butadiene to be employed in forming the lining for the metal containers can be prepared by polymerizing a mixture of from 55 to 70 percent by weight of styrene and from 45 to 30 percent of butadiene-1,3 in aqueous emulsion in usual ways. Usually, the monomeric styrene and butadiene in relative proportions corresponding to the desired composition of the copolymeric product, are admixed with an aqueous solution of an emulsifying agent and the mixture is agitated to effect emulsification and heated at temperatures between 50° and 100° C. under pressure to polymerize the monomers, thereby forming a synthetic latex or aqueous colloidal dispersion, of the copolymer. Latexes containing from 25 to 50 percent by weight of the copolymer are preferred. A suitable latex can be prepared employing procedure similar to that described in U.S. Patent No. 2,498,712.

The latex can be employed as a coating material to provide an adherent continuous film or lining of the copolymer on walls of a metal container by brushing, dipping or spraying a layer of the latex on surfaces of the container and drying the coating. For such purposes, the latex is usually admixed with a small proportion of a hydrophilic thickening agent such as methyl cellulose, carboxymethyl cellulose, hydroxyethyl cellulose or polyacrylic derivatives, suitably dissolved in water or an aqueous medium, to form a thickened latex having a consistency suitable for applying to the metal surfaces by brushing or spraying.

The latex is preferably admixed with at least one of the pigments selected from the group consisting of finely divided titanium dioxide and carbon black, together with an antioxidant, a vulcanizing agent such as sulfur, an accelerator and a thickening agent, to obtain an aqueous dispersion comprising the copolymer having a consistency similar to that of paint.

The pigment can be employed in amounts corresponding to from 1 to 50 parts by weight of the pigment per 100 parts by weight of the copolymer, e.g. in amounts of from 1 to 50 grams of the pigment per 100 grams of the copolymer.

The antioxidant, vulcanizing agent and accelerator are each employed in amounts corresponding to from 0.5 to 5 percent by weight of the copolymer.

The additives, e.g. the pigment, the antioxidant, the vulcanizing agent, the accelerator, etc., are suitably dispersed in an aqueous medium and the aqueous dispersion admixed with the latex to obtain a suitable coating composition.

Illustrative of a composition suitable for making an adherent corrosion proof lining for metal containers according to the invention is an aqueous dispersion of a mixture of ingredients comprising a latex of a copolymer of from 55 to 70 percent by weight of styrene and from 45 to 30 percent of butadiene, together with aqueous dispersions of the other ingredients in proportions and kind according to the recipe:

|  | Parts by weight | |
| --- | --- | --- |
|  | wet basis | dry basis |
| Copolymer Latex (48 percent) | 208 | 100 |
| Titanium Dioxide (65 percent) | 60 | 39 |
| Zinc Oxide (50 percent) | 15 | 7.5 |
| Vulcanizing agent (73 percent) | 2.74 | 2.0 |
| Antioxidant (55 percent) | 7.28 | 4.0 |
| Accelerator (33 percent) | 9.00 | 3.0 |
| Thickening agent (5 percent) | 8.00 | 0.4 |

The proportions of the ingredients in the aqueous dispersions which are combined in the above recipe to obtain a final coating composition can be varied widely and are not limited by the illustrative concentrations set forth above in parentheses.

Sulfur, together with a small proportion of zinc oxide, is the preferred vulcanizing agent, but any of the usual vulcanizing agents and accelerators for rubber such as benzothiazyldisulfide, tetramethylthiuramdisulfide, diphenylguanidine, di-o-tolylguanidine, tetraethylthiuramdisulfide, mercaptobenzothiazole, zinc dimethyldithiocarbamate, selenium diethyldithiocarbomate, or copper diethyldithiocarbamate can be used in the aforementioned recipe to cause vulcanization or curing of the copolymer film or lining upon heating the same at moderately elevated temperatures.

Suitable antioxidants to be employed in the above recipe are Agerite Resin D (polytrimethylquinoline), hydroquinone monobenzyl ether, phenyl-beta-naphthylamine, Agerite Stalite (heptylated diphenylamine), or di-beta-naphthyl-paraphenylene diamine.

In practice for forming a tank lining, the interior surface of a metal container such as a tank car, barrel, can or storage vessel is coated with a layer of an aqueous dispersion of the copolymer, preferably an aqueous dispersion comprising a latex of the copolymer, together with a pigment and other ingredients of a kind and in proportions similar to those set forth in the aforementioned illustrative recipe, and the coating allowed to dry at room temperature or thereabout, after which the dried coating is heated at temperatures between 120° and 300° F., preferably from 200° to 300° F., to cure or vulcanize the copolymer and obtain a non-tacky or substantially tack-free lining. Best results are obtained by applying a plurality of successive coatings, suitably two, preferably four or more, to obtain a corrosion proof impervious lining on inner walls of a metal container, e.g. a tank car. When applying a plurality of successive coatings or films of the composition to obtain a composite layer or lining, the individual coatings are usually dried at room temperature or thereabout, then heated at temperatures between 120° and 150° F. for a period of time of from 15 to 30 minutes or more, after which another layer of the coating is applied and dried in a similar way. The procedure is continued until the desired number of layers, e.g. from four to ten, have been built up on inner walls of the container, after which the composite layer or lining is cured or vulcanized by heating the same at temperatures between 200° and 300° F. In making a composite lining composed of a plurality of individually applied films it is advantageous that the individual films be only partly cured so that they retain sufficient tack to intimately bond with one another during the final heating to effect vulcanization of the copolymer and form an impervious lining.

The following examples illustrate ways in which the principle of the invention has been applied, but are not to be construed as limiting its scope.

Example 1

A synthetic latex containing 48 percent by weight of a copolymer of approximately 60 percent by weight of styrene and 40 percent of butadiene was prepared by admixing corresponding amounts of styrene and butadiene with an aqueous solution consisting of 99.62 percent by weight of water, 0.16 percent of potassium persulfate, 0.13 percent of Aquarex D (the sodium sulfate esters of a mixture of higher alcohols) and 0.09 percent of sodium bicarbonate, in a reaction vessel under a pressure sufficient to liquify the butadiene, agitating the mixture to effect emulsification, then heating the mixture at temperatures between 75° and 80° C. with continued agitation until the decrease in pressure resulting principally from consumption of the butadiene in the polymerization indicated that the polymerization was substantially complete. The reaction vessel and its contents was cooled, the pressure released and the resultant synthetic latex or aqueous colloidal dispersion of the copolymer was removed.

A coating composition was prepared by admixing a portion of the batch of the synthetic latex with aqueous dispersions of the other ingredients set forth below according to the following recipe:

|  | Parts by weight | |
| --- | --- | --- |
|  | wet basis | dry basis |
| Copolymer Latex (48 percent) | 208 | 100 |
| Titanium Dioxide[a] (65 percent) | 60 | 39 |
| Zinc Oxide (50 percent) | 15 | 7.5 |
| Sulfur (73 percent) | 2.74 | 2.0 |
| Agerite Resin D[b] (55 percent) | 7.28 | 4.0 |
| Setsit 5[c] (33 percent) | 9.00 | 3.0 |
| Acrysol GS[d] (5 percent) | 3.2 | 0.4 |

[a] A dispersion of 39 parts by weight of titanium dioxide, 20 parts of water and 1 part of potassium tripolyphosphate.
[b] Polymerized trimethyl dihydroquinoline (rubber antioxidant).
[c] Rubber latex accelerator.
[d] Aqueous solution of polyacrylic derivatives for textile sizing and thickening latexes.

The ingredients were admixed with one another in the order listed with thorough mixing. A portion of the resulting composition was applied as a thin layer to test strip of strap iron having dimensions ¼ x 1 inch by 6 inches long by dipping a test strip into the composition, allowing the layer to dry in air at room temperature, then heating the dried layer in an oven at a temperature of 140° F. for a period of 20 minutes. Four successive layers of the composition were applied to each test strip. Thereafter, the composite coating was heated at a temperature of 250° F. for a period of 60 minutes. The coated test strips were immersed in an aqueous 73 weight percent solution of sodium hydroxide maintained at a temperature of 125° F. The test strips were removed after several days, rinsed with water, dried and the coating examined for signs of failure. If the coating was intact, the test strip was reimmersed in the sodium hydroxide solution and the test continued until failure occurred. The coating withstood 105 days exposure to the liquid sodium hydroxide before failure occurred.

Other test strips of the strap iron coated with the composition were immersed in liquid aqueous sodium hydroxide solutions of 25 and 50 percent concentration, respectively, and maintained at room temperature. The coatings showed no observable attack by the sodium hydroxide after 8 months exposure.

*Example 2*

In each of two experiments, a coating composition was prepared from a portion of the batch of the synthetic latex of the copolymer of styrene and butadiene prepared in Example 1, employing the recipe given therein, but with 1.32 parts by weight of the sulfur dispersion in one experiment and without sulfur in the other. Test strips of strap iron were coated with four layers of the composition and baked or cured employing procedures described in Example 1, after which the test strips were immersed in liquid aqueous 73 weight percent sodium hydroxide solution at a temperature of 125° F. until failure of the coating occurred. The coating containing no sulfur as vulcanizing agent withstood 39 days of exposure to the liquid concentrated sodium hydroxide at a temperature of 125° F. before failure of the coating occurred. The coating containing the sulfur as vulcanizing agent withstood exposure to the sodium hydroxide for a period of 83 days before failure.

*Example 3*

The experiments of Example 2 were repeated, except that the coated test panels were maintained in an atmosphere of nitrogen while being tested for their ability to withstand the action of an aqueous 73 weight percent solution of sodium hydroxide at a temperature of 125° C. Both the coating containing sulfur as a vulcanizing agent and the coating without sulfur withstood exposure to the hot sodium hydroxide for a period of 131 days before failure of the coating occurred.

*Example 4*

A synthetic latex containing 48 percent by weight of a copolymer of approximately 33 percent by weight of butadiene and 67 percent of styrene was prepared by procedure similar to that described in Example 1. An aqueous coating composition was prepared from the latex, together with aqueous dispersions of the other ingredients of kinds and in proportions as stated in the recipe given in Example 1. A portion of the composition was applied as a coating to test strips of strap iron employing procedure as described in Example 1. The coating was tested for its ability to withstand the action of a liquid aqueous 73 weight percent sodium hydroxide solution at a temperature of 125° C. No failure of the coating had occurred after 195 days of immersion in the hot sodium hydroxide solution.

We claim:

1. A metal container having the interior surfaces thereof covered with an adherent corrosion proof lining consisting of a continuous coating comprising a plurality of dried layers, adhered to one another, of an aqueous dispersion comprising a latex of a copolymer of from 55 to 70 percent by weight of styrene and from 45 to 30 percent of butadiene, said latex containing from 25 to 50 percent by weight of the copolymer, intimately blended with from 1 to 50 parts by weight of at least one pigment selected from the group consisting of finely divided titanium dioxide and carbon black, per 100 parts by weight of the copolymer.

2. The product of claim 1 in which the pigment is titanium dioxide.

3. The product of claim 1 in which the pigment is a mixture of titanium dioxide and carbon black.

4. A metal container having the interior surface thereof covered with an adherent corrosion proof lining consisting of a vulcanized continuous coating comprising a plurality of dried layers, adhered to one another, of an aqueous dispersion comprising a latex of a copolymer of from 55 to 70 percent by weight of styrene and from 45 to 30 percent of butadiene, said latex containing from 25 to 50 percent by weight of the copolymer, intimately blended with from 1 to 50 parts by weight of a pigment selected from the group consisting of finely divided titanium dioxide and carbon black, per 100 parts by weight of the copolymer.

5. The product of claim 4 in which the pigment is titanium dioxide.

6. The product of claim 4 in which the pigment is a mixture of titanium dioxide and carbon black.

References Cited in the file of this patent

UNITED STATES PATENTS

| Number | Name | Date |
|---|---|---|
| 2,311,004 | Thoms | Feb. 16, 1943 |
| 2,412,528 | Morrell | Dec. 10, 1946 |
| 2,424,736 | Brams | July 29, 1947 |
| 2,448,683 | Peterson | Sept. 7, 1948 |
| 2,453,471 | Switzer | Nov. 9, 1948 |
| 2,476,833 | Albert | July 19, 1949 |
| 2,605,242 | Betts | July 29, 1952 |
| 2,676,930 | McKoy | Apr. 27, 1954 |
| 2,751,309 | Baxter | June 19, 1956 |
| 2,805,962 | Hendricks | Sept. 10, 1957 |
| 2,820,773 | Childers | Jan. 21, 1958 |